US010780836B1

(12) United States Patent
Fisher

(10) Patent No.: US 10,780,836 B1
(45) Date of Patent: Sep. 22, 2020

(54) STORAGE PANEL SYSTEM FOR TRUCK BEDS

(71) Applicant: Valhalla Off-road Research Inc, Sumner, WA (US)

(72) Inventor: Ian Fisher, Auburn, WA (US)

(73) Assignee: VALHALLA OFF-ROAD RESEARCH INC, Sumner, WA (US)

( * ) Notice: Subject to any disclaimer, the term of this patent is extended or adjusted under 35 U.S.C. 154(b) by 0 days.

(21) Appl. No.: 16/392,946

(22) Filed: Apr. 24, 2019

(51) Int. Cl.
*B60R 9/02* (2006.01)
*B60R 9/06* (2006.01)
*B62D 33/023* (2006.01)

(52) U.S. Cl.
CPC ............... *B60R 9/02* (2013.01); *B60R 9/06* (2013.01); *B62D 33/023* (2013.01)

(58) Field of Classification Search
CPC B60R 9/02; B60R 9/06; B62D 33/023; B60P 7/0815
USPC .......................................... 224/402–405, 547
See application file for complete search history.

(56) References Cited

U.S. PATENT DOCUMENTS

| | | | | | |
|---|---|---|---|---|---|
| 3,848,786 | A | * | 11/1974 | Baxter | B60P 7/12 224/546 |
| 4,007,863 | A | * | 2/1977 | Norris | B62D 43/08 224/403 |
| 4,944,612 | A | * | 7/1990 | Abstetar | B60R 13/01 296/39.2 |
| 5,221,119 | A | * | 6/1993 | Emery | B60R 13/01 220/495.01 |
| 5,560,576 | A | * | 10/1996 | Cargill | B60P 7/15 224/331 |
| 6,003,923 | A | * | 12/1999 | Scott | B60R 11/06 296/37.6 |
| 7,055,844 | B1 | * | 6/2006 | Bostedt | B60D 1/52 224/403 |
| 7,644,449 | B2 | | 1/2010 | Hellweg | |
| 8,052,019 | B2 | * | 11/2011 | Plavetich | B60P 3/06 224/403 |

(Continued)

FOREIGN PATENT DOCUMENTS

WO    WO 2018/150389    8/2018

OTHER PUBLICATIONS

Welcome to Springtail Solutions, Springtail Solutions, <http://store.springtailsolutions.com/?fbclid=IwAR2IZmWg2HG-b6YALhEAnUdu0vsgGYumOhylS0z7FGhMYeHzVOh9fxOOYJU>, accessed Apr. 18, 2019, all pages pertinent, two total pages.

(Continued)

*Primary Examiner* — Adam J Waggenspack
(74) *Attorney, Agent, or Firm* — John J. Bamert, Esq.; Lowe Graham Jones PLLC

(57) ABSTRACT

A substantially panel system for a truck includes a middle portion, a clamping portion, a displacement portion, and a clamp. The middle portion has mounting features configured to rigidly receive accessories or accessory mounts. The clamping portion is disposed above the middle portion. The displacement portion is disposed between the middle portion and the clamping portion and defines a lateral offset of the middle portion from the clamping portion. The clamp pulls the clamping portion toward a lip of a bed rail of a sidewall of a truck bed, thereby coupling the panel system to the sidewall of the truck bed, without the middle or displacement portions laterally extending farther toward the lip of the bed rail than the clamping portion.

20 Claims, 12 Drawing Sheets

(56) References Cited

U.S. PATENT DOCUMENTS

| | | | |
|---|---|---|---|
| D678,167 S | 3/2013 | Frost | |
| 8,657,542 B2* | 2/2014 | Liu | B60P 7/0815 410/104 |
| 8,931,673 B2 | 1/2015 | Stevens, IV | |
| 9,565,922 B2 | 2/2017 | Cole et al. | |
| D784,113 S | 4/2017 | Rago | |
| D784,114 S | 4/2017 | Rago | |
| D784,115 S | 4/2017 | Rago | |
| D787,918 S | 5/2017 | Rago | |
| 9,664,481 B2 | 5/2017 | Alcantra et al. | |
| D796,938 S | 9/2017 | Rago | |
| 9,834,151 B2 | 12/2017 | Henry | |
| D820,003 S | 6/2018 | Capdepon | |
| 2005/0236867 A1 | 10/2005 | McNulty et al. | |
| 2007/0045368 A1 | 3/2007 | Lavelle | |
| 2009/0014602 A1 | 1/2009 | Frost | |
| 2013/0193179 A1 | 8/2013 | Davidson | |
| 2018/0170452 A1 | 6/2018 | Reiners et al. | |
| 2019/0092213 A1* | 3/2019 | Beenen | B60R 9/048 |

OTHER PUBLICATIONS

JL Rear Door Folding Tray/MOPLLE Panel, Riser and Bag Combo, Springtail Solutions, <http://store.springtailsolutions.com/JL-Rear-Door-Folding-TrayMOLLE-Panel-Riser-and-Bag-Combo-_p_80.html>, accessed Apr. 18, 2019, all pages pertinent, five total pages.

JL Rear Door Folding Tray/MOLLE Panel, Springtail Solutions, <http://store.springtailsolutions.com/JL-Rear-Door-Folding-TrayMOLLE-Panel_p_73.html>, accessed Apr. 18, 2019, all pages pertinent, four total pages.

FJ Cruiser Rear Door Folding MOLLE Rack Combo, Springtail Solutions, <http://store.springtailsolutions.com/FJ-Cruiser-Rear-Door-Folding-MOLLE-Rack-Combo_p_50.html>, accessed Apr. 18, 2019, all pages pertinent, five total pages.

BuiltRight Industries Bedside Rack System 4 Panel Kit—2015-2019 Ford F-150, Builtirhgt Industries, <https://www.builtrightind.com/products/builtright-industries-mbrs-fseries-kit>, accessed Apr. 18, 2019, all pages pertinent, five total pages.

2005-2020 Toyota Tacoma Bed MOLLE System, Cali Raised LED, <https://www.builtrightind.com/products/builtright-industries-mbrs-fseries-kit>, accessed Apr. 18, 2019, all pages pertinent, two total pages.

2005-2020 Toyota Tacoma Bed MOLLE System for Bakflip Cover, Cali Raised LED, <https://caliraisedled.com/collections/2016-2020-toyota-tacoma/products/copy-of-2005-2019-toyota-tacoma-bed-molle-system>, accessed Apr. 22, 2019, all pages pertinent, two total pages.

Ron, Group Buy #17—Rear Seat MOLLE Panels and Bed Management System for 2nd/3rd gen DC or AC., Tacoma World, <https://www.tacomaworld.com/threads/group-buy-17-rear-seat-molle-panels-and-bed-management-system-for-2nd-3rd-gen-dc-or-ac.410254/>, published Jan. 13, 2016, accessed Jul. 29, 2019, all pages pertinent, 21 total pages.

* cited by examiner

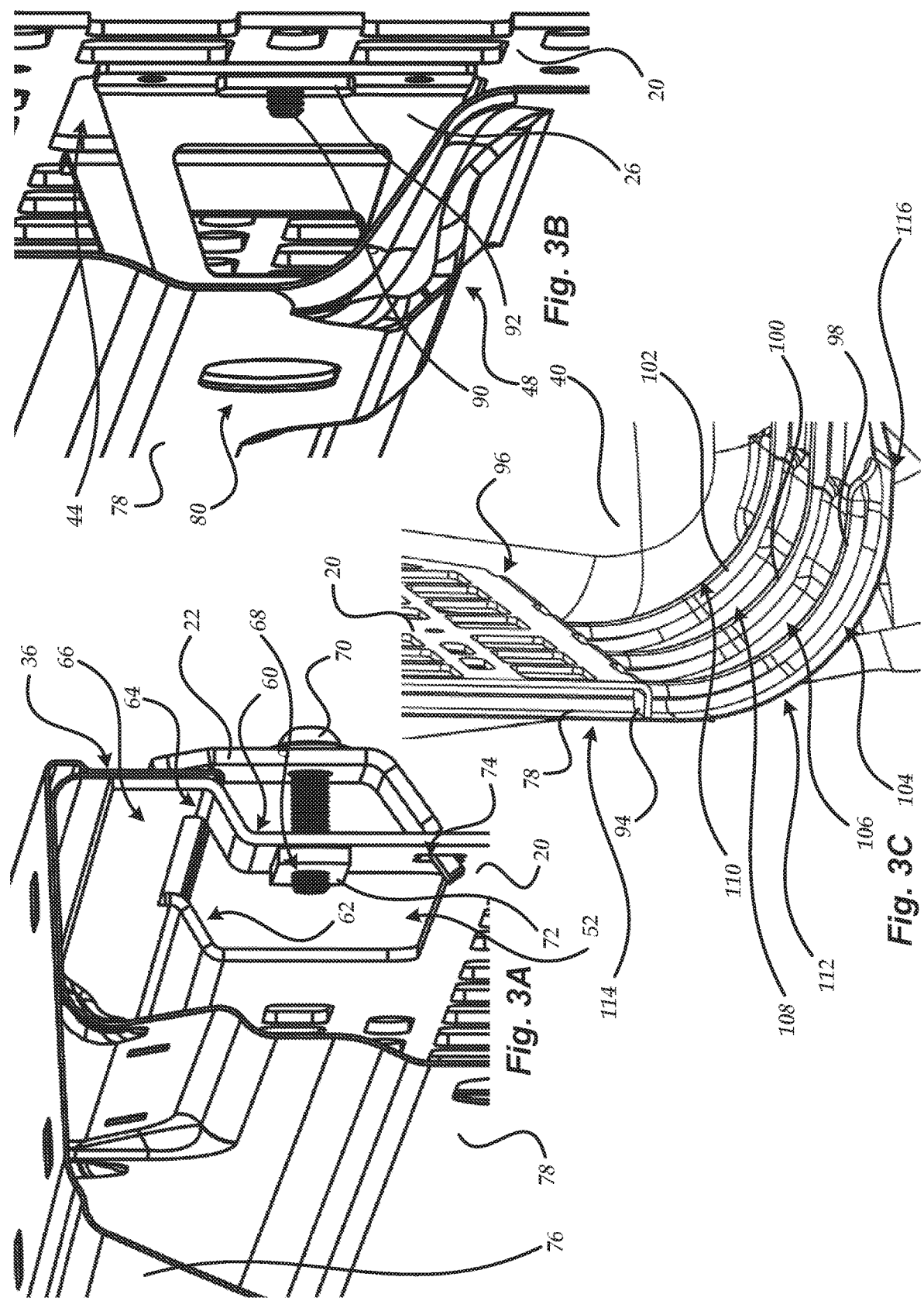

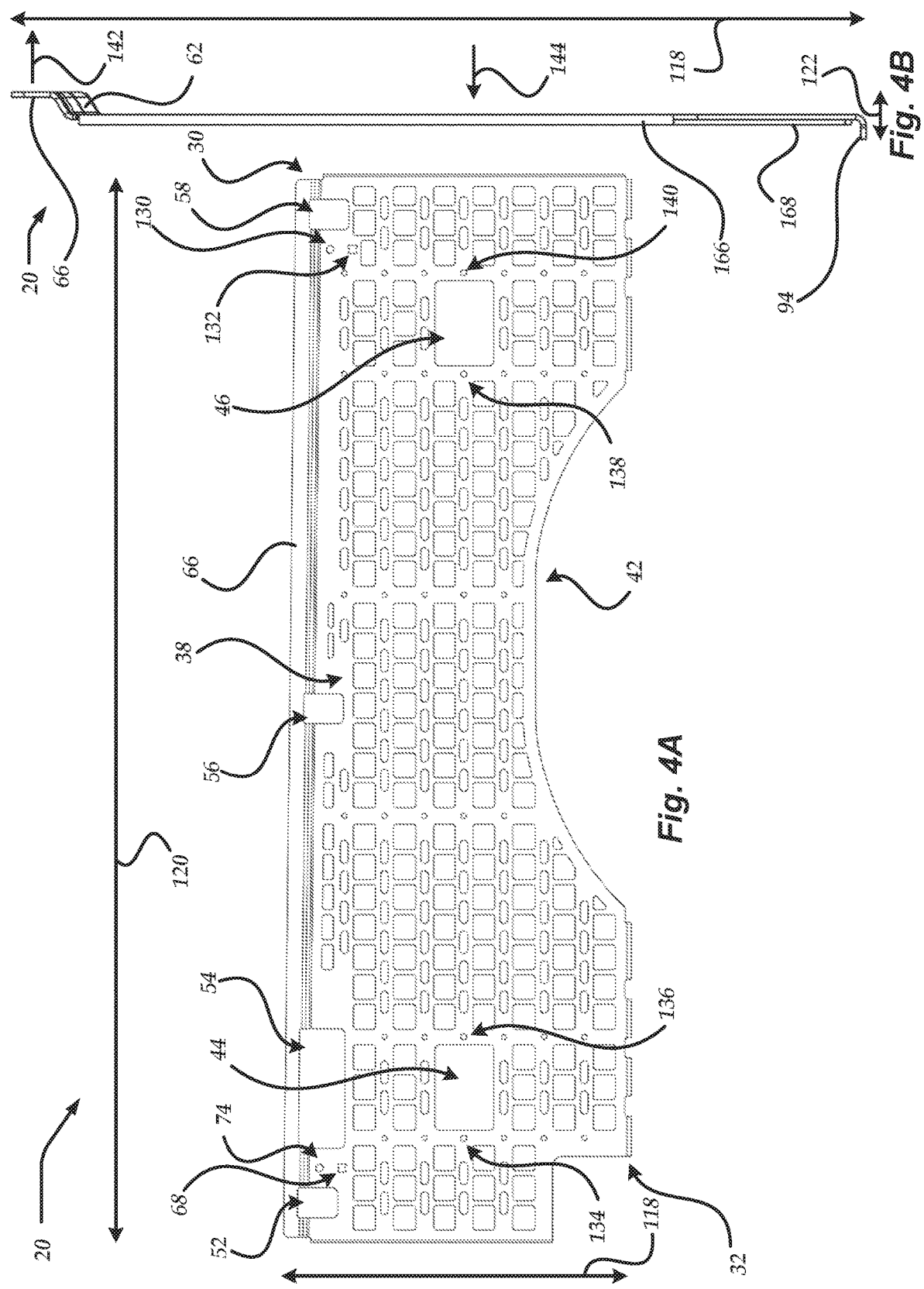

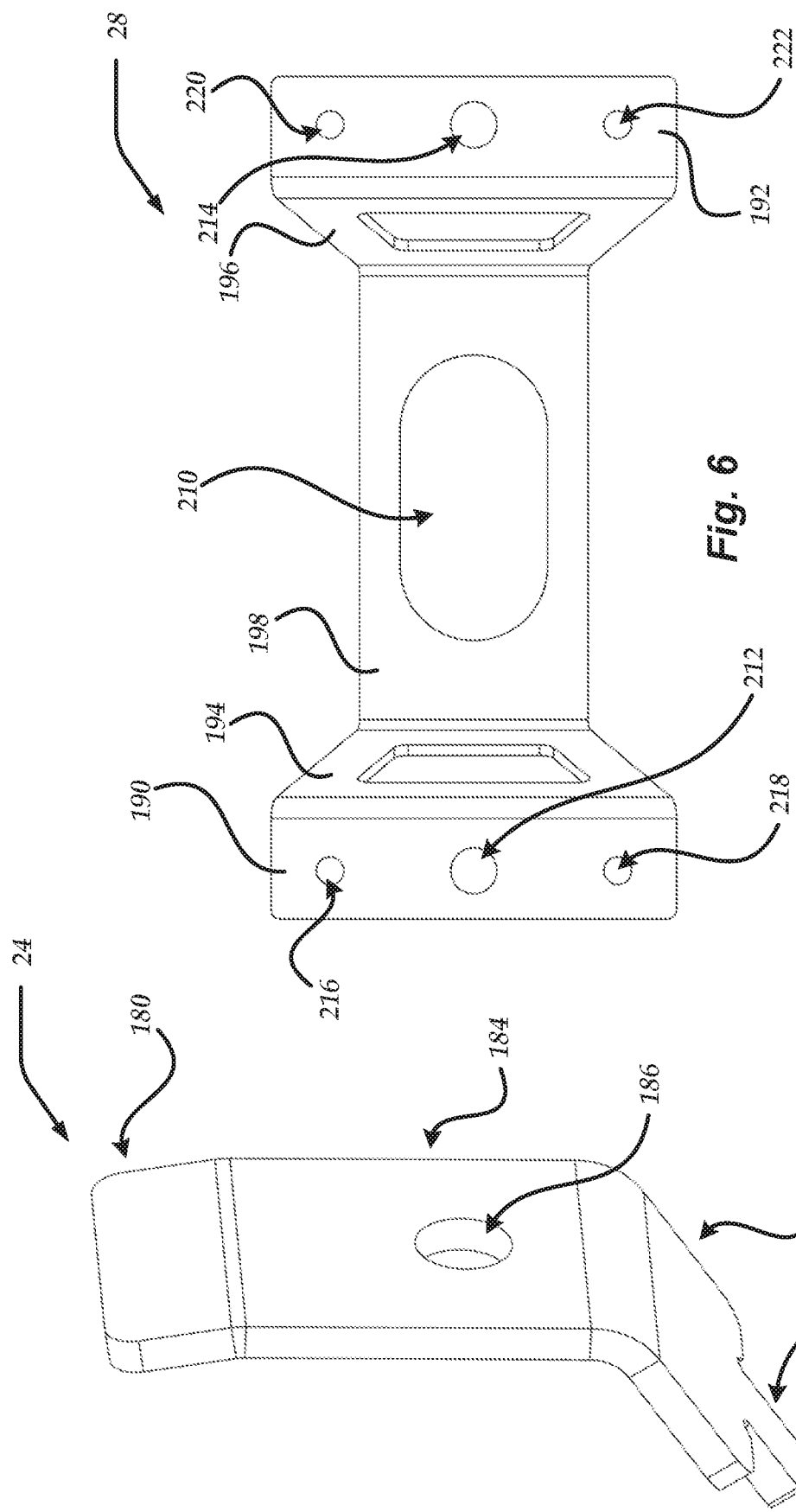

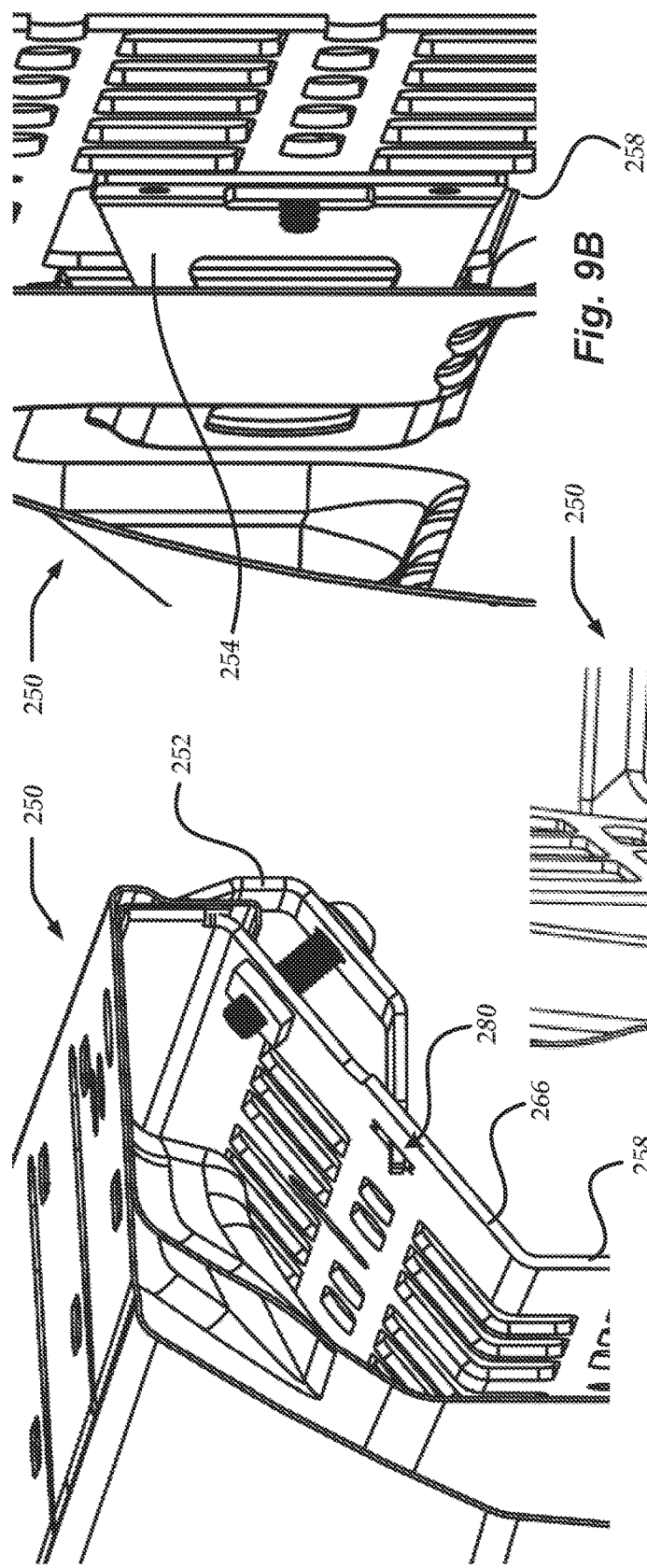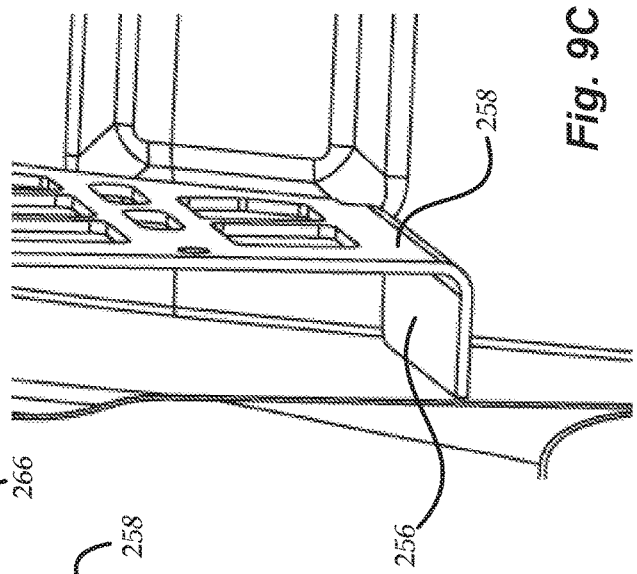

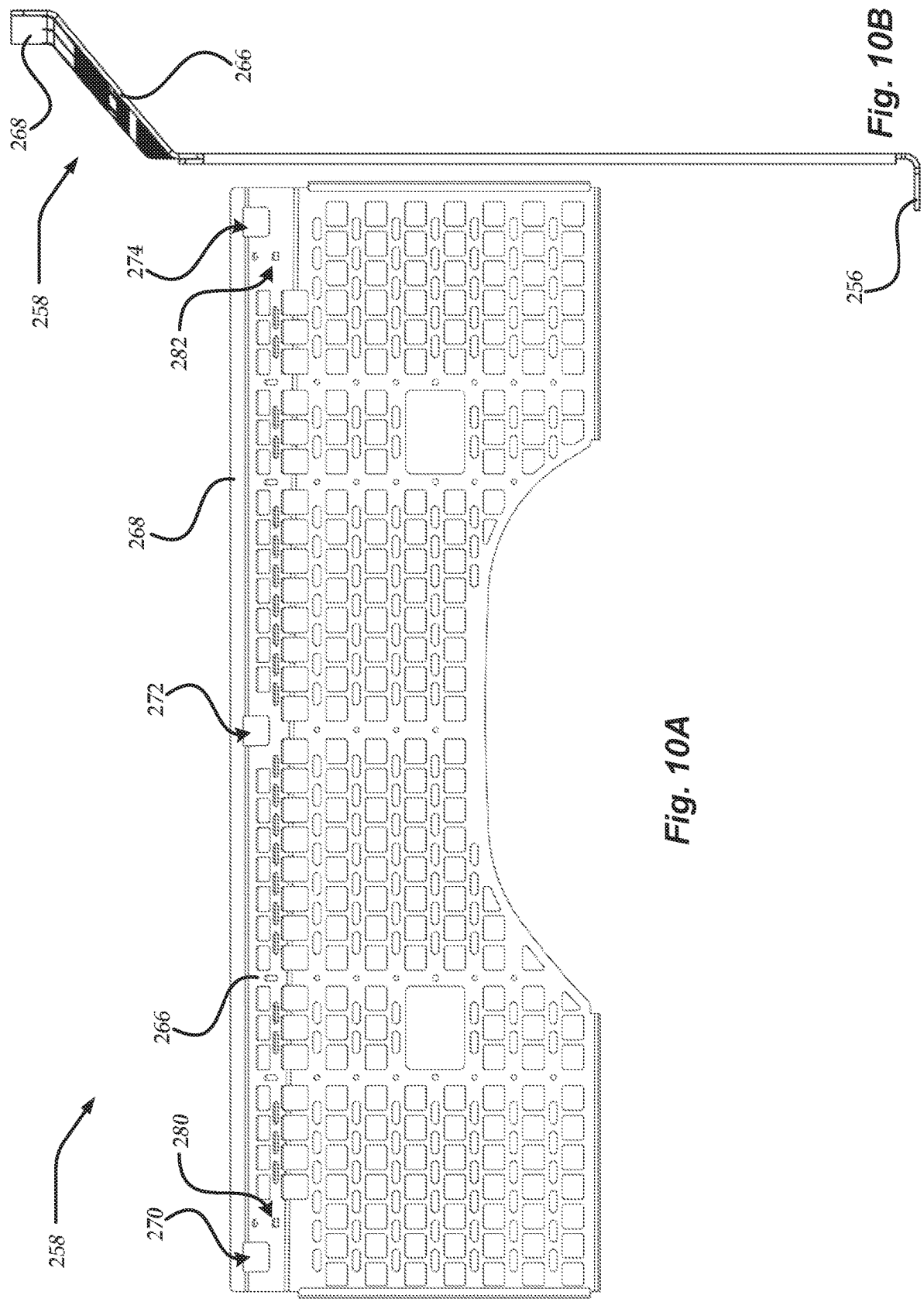

STORAGE PANEL SYSTEM FOR TRUCK BEDS

FIELD OF THE INVENTION

This invention generally relates to storage panels and, more particularly, to storage panels for pickup truck beds.

BACKGROUND OF THE INVENTION

Pickup trucks typically have open beds for storage of various items including bulk items such as sand, gravel, etc. and individual items such as tools disposed rearward of enclosed cabs. Bed liners are often installed in truck beds to protect the inner-side of the truck bed from damage. Bed liners are extremely useful for protecting truck beds from bulk items such as gravel yet fail to improve the ability to rigidly store tools and accessories (for example, shovels, axes, containers, or other accessories) in the truck bed because they typically lack mounting structures that facilitate securing such tools and accessories to the bed liners. Accordingly, users often instead install storage panels along the inner-sides of the left and right vertical walls of the truck beds to facilitate securing such accessories.

Storage panels for truck beds typically have many exposed mounting features, such as rows and columns of uniform openings configured to rigidly receive mounts that facilitate rigidly coupling accessories to the storage panels. Examples of such storage panels are available under the mark CALI RAISED LED or the mark BUILTRIGHT INDUSTRIES. An example of a similar storage panel for interior walls of rear swing doors of sport utility vehicles (SUVs) is shown in U.S. PreGrant Publication No. 2009/0014602 issued to Frost. Such storage panels require modifying the truck bed or installation location in the vehicle (for example, drilling into a sidewall of the truck bed, removing or relocating one or more portions of the truck bed such as T-slot rails, or other modifications), prohibit use of manufacturer-installed mounting features in the sidewalls of the truck beds (for example, tie-down-ring receiving holes that are configured to receive tie-down rings, which typically have a turnable ring and spring loaded forks that secure the turnable to a manufacturer-installed tie-down-ring receiving hole), prevent use of many (if not all) common truck-bed canopies, canopy racks, or covers (for example, tonneau covers such as roll-up tonneau covers available under the mark BAK REVOLVER OR BAK REVOLVER X2, truck bed canopies, or other truck-bed covers), fail to be secured to or fail to secure accessories to the truck bed with sufficient rigidity for off-road applications (for example, recreational off-road driving or commercial or other jobsite off-road driving such as forest service or logging activities), or unacceptably reduce the usable space in the truck beds, as is the case in the designs of the storage panels available under the mark CALI RAISED LED or the mark BUILTRIGHT INDUSTRIES and disclosed in U.S. PreGrant Publication No. 2009/0014602 issued to Frost.

SUMMARY OF THE INVENTION

It is therefore an object of the present invention to provide storage panel systems for truck beds that facilitate rigidly securing accessories in the truck beds without modifying the truck beds.

It is also an object of the present invention to provide storage panel systems for truck beds that achieve the above object and that also facilitate clamping bed covers in closed configurations to bed rails of sidewalls of the truck beds when the storage panel systems are installed in the truck beds.

It is another object of the present invention to provide storage panel systems for truck beds that achieve the above objects and that also facilitate use of manufacturer-installed mounting features in the sidewalls of the truck beds.

It is a further object of the present invention to provide storage panel systems for truck beds that achieve the above objects and that also facilitate securing storage panels and accessories with sufficient rigidity for off-road applications.

It is yet another object of the present invention to provide storage panel systems for truck beds that achieve the above objects and that also inhibit the usable space in the truck beds to a lesser degree than known storage panels.

The invention achieves the above objects, as well as other objects and advantages that will become apparent from the description that follows, by providing a substantially planar panel system for a truck. The system defines a vertical axis, a longitudinal axis, and a lateral axis. The system includes a middle portion, a clamping portion, and a displacement portion. The middle portion extends along the vertical axis and the longitudinal axis and has an array of mounting features that include openings configured to rigidly receive accessories or accessory mounts. The clamping portion extends along the longitudinal axis and is disposed above the middle portion along the vertical axis. The displacement portion is disposed between the middle portion and the clamping portion and defines an offset of the middle portion from the clamping portion along the lateral axis. The clamping portion is configured to clamp a lip of a bed rail of a sidewall of a truck bed of the truck, thereby coupling the panel system to the sidewall of the truck bed of the truck. The system preferably also includes a clamp having a lip-contact portion and a panel-contact portion. The clamp is configured to pull the clamping portion toward the lip of the bed rail of the sidewall of the truck bed of the truck with the lip-contact portion of the clamp contacting the lip of the bed rail and with the panel-contact portion of the clamp contacting one of the middle portion or the displacement portion, to cooperatively with the clamping portion clamp the lip of the bed rail, and to thereby couple the panel system to the sidewall of the truck bed of the truck.

In the preferred versions of the invention, the panel system is configured such that, when the panel system is coupled to the sidewall of the truck bed of the truck, no portion of the middle portion or the displacement portion extends farther toward the lip of the bed rail along the lateral axis than the clamping portion.

Preferably, the panel system further includes a bracket. The bracket preferably includes a mounting plate defining a tie-down-ring receiving hole that, when aligned with a manufacturer-installed mounting structure in the sidewall of the truck bed of the truck, is configured to facilitate inserting a tie-down ring through the mounting plate, securing the tie-down ring to the manufacturer-installed mounting structure in the sidewall of the truck bed of the truck, and thereby clamping the bracket to the sidewall of the truck bed of the truck. The bracket preferably has at least one stability arm that extends toward the middle portion from the mounting plate. The bracket preferably has at least one panel-contact flange that extends along the middle portion from a respective one of the at least one stability arm and that is configured to couple the bracket to the middle portion and thereby couple the panel system to the sidewall of the truck bed of the truck with the mounting plate of the bracket being disposed opposite the clamping portion from the lip of the bed rail of the sidewall of the truck bed of the truck.

Preferably, the panel system further includes a foot that extends from the middle portion along the lateral axis in a direction opposite to a direction that the displacement portion extends from the middle portion along the lateral axis. The foot is preferably configured to, when the panel system is coupled to the sidewall of the truck bed of the truck, press against the sidewall of the truck bed of the truck to thereby reduce movement of the middle portion relative to the sidewall of the truck bed of the truck during use, without the foot directly coupling to the sidewall of the truck bed of the truck.

Preferably, the middle portion defines a tie-down-ring access opening that is configured to, when the panel system is coupled to the sidewall of the truck bed of the truck, provide a user hand access to utilize a tie-down ring secured to a manufacturer-installed mounting structure in the sidewall of the truck bed of the truck through the middle portion with the manufacturer-installed mounting structure being disposed opposite the clamping portion from the lip of the bed rail along the lateral axis, without moving any portion of the panel system.

Typically, the sidewall of the truck bed of the truck has a wheel-well hump that has a lateral length measured parallel to the lateral axis when the panel system is coupled to the sidewall of the truck bed of the truck. Preferably, the panel system is configured to, when the panel system is coupled to the sidewall of the truck bed of the pickup truck, have no portion of the middle portion and the displacement portion extend farther than 50% of the lateral length of the wheel-well hump in the direction of the clamping portion from the middle portion along the lateral axis.

Typically, the sidewall of the truck bed of the truck has a wheel-well hump that has a height measured parallel to the vertical axis when the panel system is coupled to the sidewall of the truck bed of the truck. Preferably, the panel system is configured to, when the panel system is coupled to the sidewall of the truck bed of the truck, have no portion of the middle portion extend lower than a top 80% of the height of the wheel-well hump along the vertical axis.

Preferably, one of the middle portion or the displacement portion defines a clamp securing aperture. Preferably, the clamp has a securing projection that is configured to, when the panel system is coupled to the sidewall of the truck bed of the truck, extend into the clamp securing aperture to facilitate maintaining an orientation of the clamp relative to the middle portion.

Preferably, the panel system further includes a clamping fastener. Preferably, one of the middle portion or the displacement portion defines a clamping fastener aperture. Preferably, the clamping fastener extends from the clamp into the clamping fastener aperture to facilitate pulling the clamping portion toward the lip of the bed rail of the sidewall of the truck bed of the truck.

Typically, the sidewall has a vertically oriented portion that is offset from the lip of the bed rail of the sidewall of the truck bed of the truck along the lateral axis when the panel system is coupled to the sidewall. Preferably, when the panel system is coupled to the sidewall, one or more of the middle portion, the clamping portion, or the displacement portion are disposed under the bed rail of the sidewall and between the vertically oriented portion of the sidewall and the lip of the bed rail.

Preferably, at least the displacement portion defines a clamp opening that, when the panel system is coupled to the sidewall of the truck bed of the truck, facilitates locking a bed cover in a closed configuration over a top of the truck bed of the truck, typically without moving any portion of the panel system.

BRIEF DESCRIPTION OF THE DRAWINGS

Preferred versions of the present invention are described in detail below with reference to the following drawings.

FIG. 3A is an isometric perspective cross-sectional view of the storage panel system of FIG. 1, taken along line AA with a preferred clamp of the storage panel system shown close-up.

FIG. 3B is an isometric perspective cross-sectional view of the storage panel system of FIG. 1, taken along line AA with a preferred bracket of the storage panel system shown close-up.

FIG. 3C is an isometric perspective cross-sectional view of the storage panel system of FIG. 1, taken along line AA with a preferred foot portion of a storage panel of the storage panel system shown close-up.

FIG. 4A is an isometric elevational view of a preferred storage panel of the storage panel system of FIG. 1.

FIG. 4B is an isometric side elevational view of the storage panel of FIG. 4A.

FIG. 5 is an isometric perspective view of a preferred clamp of the storage panel system of FIG. 1.

FIG. 6 is an isometric elevational view of a preferred bracket of the storage panel system of FIG. 1.

FIG. 9A is an isometric perspective cross-sectional view of the storage panel system of FIG. 7, taken along line BB with a preferred clamp of the storage panel system shown close-up.

FIG. 9B is an isometric perspective cross-sectional view of the storage panel system of FIG. 7, taken along line BB with a preferred bracket of the storage panel system shown close-up.

FIG. 9C is an isometric perspective cross-sectional view of the storage panel system of FIG. 7, taken along line BB with a preferred foot portion of a storage panel of the storage panel system shown close-up.

FIG. 10A is an isometric elevational view of a preferred storage panel of the storage panel system of FIG. 7.

FIG. 10B is an isometric side elevational view of the storage panel of FIG. 10A.

DETAILED DESCRIPTION OF THE PREFERRED EMBODIMENT

Figure 1:
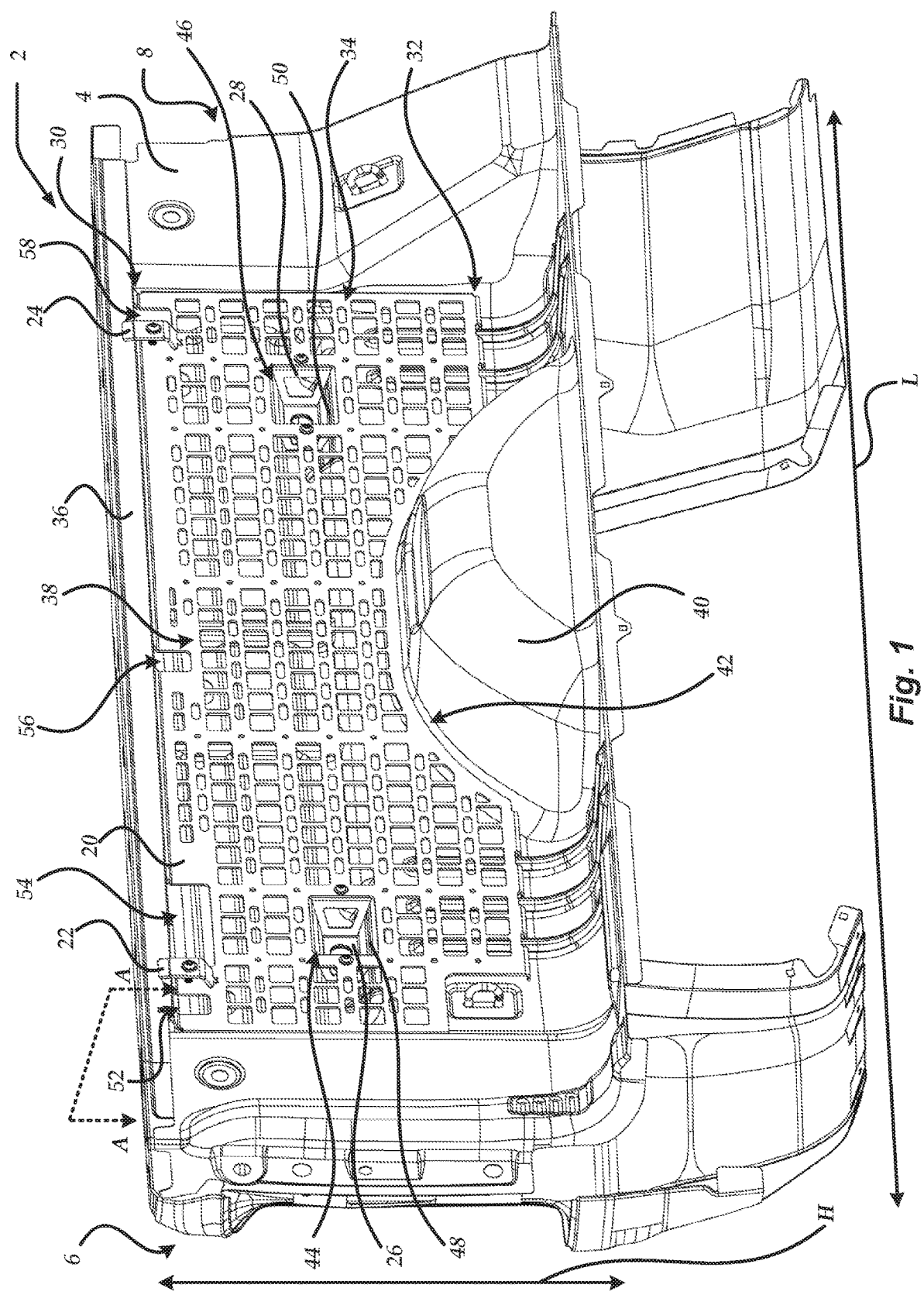
FIG. 1 is an isometric perspective view of a preferred storage panel system installed in a pickup truck bed.

A preferred storage panel system 2 in accordance with the principles of the invention is shown in FIG. 1. As shown in FIG. 1, the storage panel system 2 is configured to be installed in a left upright sidewall 4 of a truck bed of a pickup truck (only a portion of the truck bed shown). Preferably, the storage panel system 2 is installed in the sidewall 4 of the truck bed without a bed liner (not shown) that is separable from the truck bed (for example, with or without a spray-on bed liner yet without a separable plastic liner). The sidewall 4 of the truck bed has a rear end portion 6 where a tailgate is typically installed (not shown), a front end portion 8 that is typically adjacent to a cab (not shown), a length L that extends from the rear end portion 6 to the front end portion 8, and a height H that extends perpendicular to the length of the sidewall 4. A floor and a front upright wall of the truck bed (not shown) extend from the left sidewall 4 to a right upright sidewall (not shown) that is typically a mirrored version of the left sidewall 4. A mirrored version of the storage panel system 2 can be installed in the right upright sidewall of the truck bed.

The storage panel system 2 preferably includes a panel 20 that extends along the length and height of the sidewall 4, one or more clamps (for example, clamps 22, 24), and one or more brackets (for example, brackets 26, 28). The panel 20 has a top end portion 30 (see FIGS. 2A and 3A), a bottom end portion 32 (see FIG. 3C), and a middle portion 34 that extends from the top end portion 30 to the bottom end portion 32. The top end portion 32 of the panel 2 is preferably disposed opposite an upper lip 36 (for example, a bed rail) of the sidewall 4 from the one or more clamps. The bottom end portion 32 preferably includes one or more feet that press against the sidewall 4 (as discussed further regarding FIGS. 3C and 4B). The panel 20 is preferably made of sheet metal rolled off a coil into a flat sheet (for example, mild steel such as hot rolled picked and oiled (HRPO) steel). The panel 20 preferably undergoes an electrophoretic painting process (i.e., the panel 20 has an electrocoat (e-coat)) with epoxy primer and a powder coat finish. Preferably, when the storage panel system 2 is installed on the sidewall 4 of the truck, no portion of the bottom end portion 32 extends farther inward in the lateral dimension than the middle portion 34 (see FIGS. 2A-3C).

The middle portion 34 preferably has one or more arrays of mounting features (for example, mounting feature array 38) that typically include one or more rows or columns of openings (for example, one or more openings that conform to one or more standards for Modular Lightweight Load-carrying Equipment (MOLLE) or Pouch Attachment Ladder Systems (PALs) or other openings) that are configured to rigidly receive accessories or mounts (for example, clamps available under the mark QUICK FIST) that facilitate rigidly coupling accessories (for example, shovels, axes, containers, fire extinguishers, gas cans (for example, gas cans available under the mark ROTOPAX) or other accessories) to the storage panel 20. Preferably, when the storage panel system 2 is installed on the sidewall 4 of the truck, no portion of the middle portion 34 extends farther inward in the lateral dimension than the top end portion 30. The panel 20 preferably extends forward and rearward of a left wheel-well hump 40 and preferably includes a wheel-well-hump recess 42, with the bottom end portion 32 extending forward and rearward of the wheel-well hump 40 on each side of the wheel-well-hump recess 42. The panel 20 preferably includes one or more mounting-structure access openings (for example, tie-down-ring access openings 44, 46) that are vertically and horizontally aligned with the one or more brackets and that facilitate accessing one or more accessory bed tie-down rings (not shown) that are received in one or more manufacturer-installed mounting features in the sidewall 4 to clamp the one or more brackets to the sidewall 4 (see FIGS. 2A, 2B, and 3B).

The tie-down-ring access openings 44, 46 preferably also facilitate use of cross rails (for example, wood studs or cross rails available under the mark GEARON) that couple to accessory tie-down rings installed in the manufacturer-installed mounting features or that rest on manufacturer-installed stud supports (for example, manufacturer-installed stud supports 48, 50). The panel 20 preferably has one or more clamp openings disposed in one or more of the middle portion 34, the displacement portion 62, or the clamping portion 66 (for example, clamp openings 52-58 disposed in the middle portion 34, the displacement portion 62, and the clamping portion 66) that facilitate clamping one or more accessories to the bed rail, such as clamping or locking truck-bed canopies, canopy racks, or covers (not shown) in a closed configuration (for example, an unrolled configuration) in which the top of the truck bed is completely closed or rails (not shown) that support truck-bed covers (for example, tonneau covers such as roll-up tonneau covers available under the mark BAK REVOLVER OR BAK REVOLVER X2, truck bed canopies, or other accessories). When the storage panel system 2 is installed in the truck, an entirety of all the mounting features in the panel 20 are preferably accessible to the user without moving any component of the storage panel system 2 or the truck. Preferably, the one or more clamps, the one or more brackets, and the shape of the panel 20 cooperatively facilitate securing the panel 20 to the sidewall 4 with sufficient rigidity for off-road activities (as discussed further regarding FIGS. 3A-3C and 4B) while facilitating use of manufacturer-installed mounting features in the sidewall 4 (as discussed further regarding FIGS. 2A, 2B, and 3B) and while inhibiting the usable space in the truck bed to a lesser degree than known storage panels (see FIGS. 2A and 2B), all without modifying the truck bed.

Figure 2B:
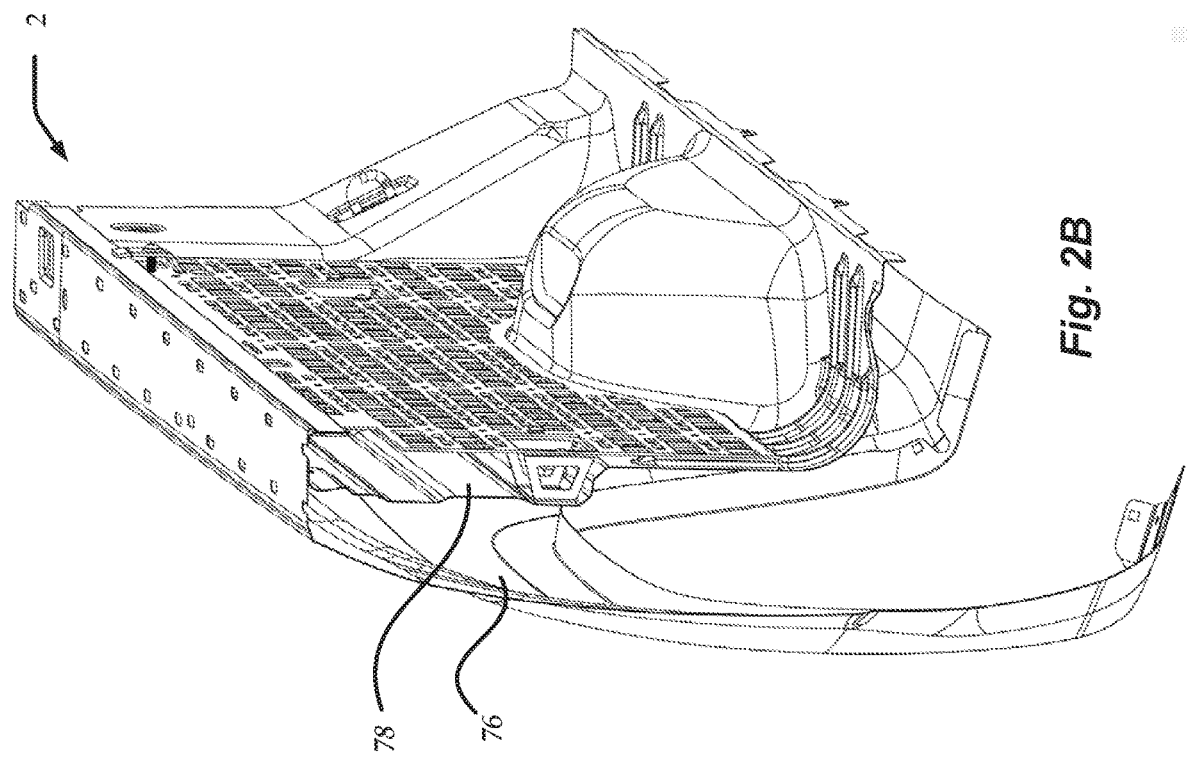
FIG. 2B is an isometric perspective cross-sectional view of the storage panel system of FIG. 1, taken along line AA.
Figure 2A:
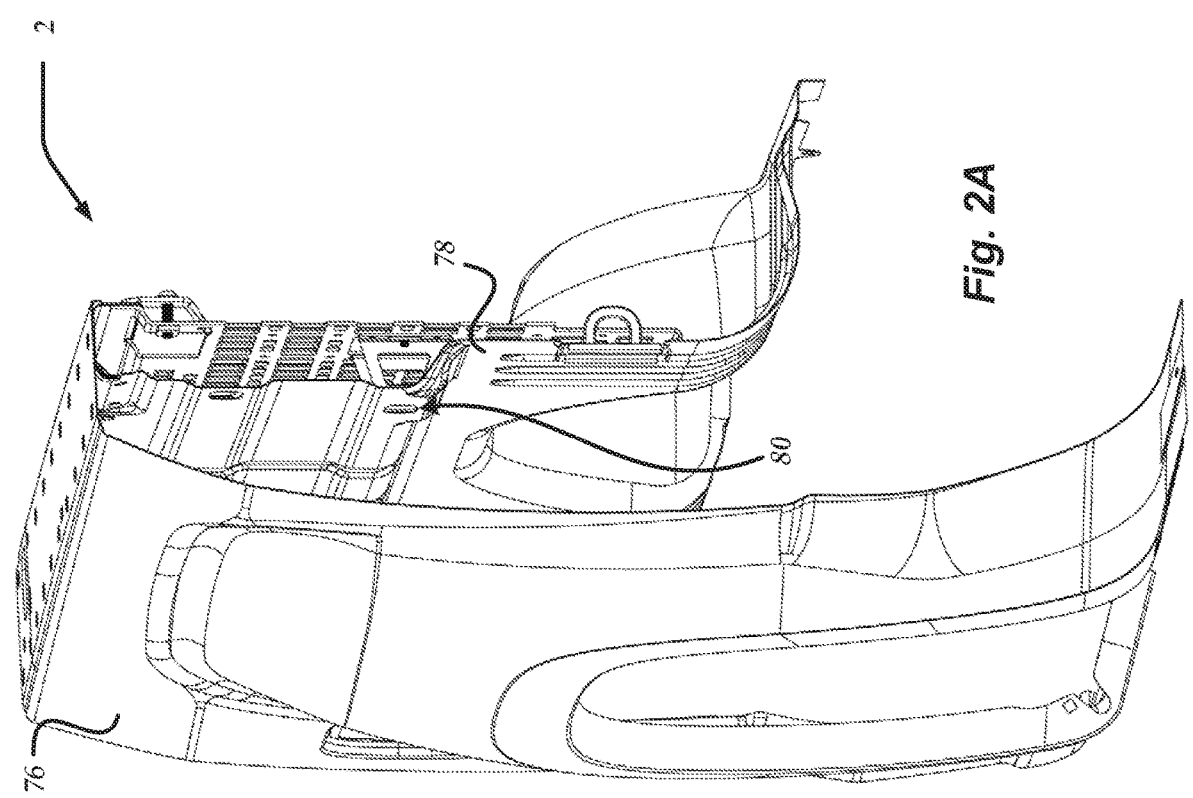
FIG. 2A is an isometric perspective cross-sectional view of the storage panel system of FIG. 1, taken along line AA.

FIG. 2A is an isometric perspective cross-sectional view of the storage panel system 2, taken along line AA in FIG. 1. FIG. 2B is an isometric perspective cross-sectional view of the storage panel system 2, taken along line AA in FIG. 1. Preferably, when the storage panel system 2 is installed on the sidewall 4 of the truck, no portion of the panel 2 extends farther inward in the lateral dimension than upper lip 36 of the sidewall 4. Preferably, when the storage panel system 2 is installed on the sidewall 4 of the truck, no portion of the panel 2 extends farther inward in the lateral dimension than 20, 50, or 80 percent of the wheel-well hump 40 as measured in the lateral dimension. Preferably, when the storage panel system 2 is installed on the sidewall 4 of the truck, no portion of the panel 2 is disposed farther inward in the lateral dimension than a bottom transition portion of the sidewall 4 that transitions between a generally vertical orientation (more vertical than horizontal) and a generally horizontal orientation (more horizontal than vertical) when the truck is on horizontal ground.

Figure 4C:
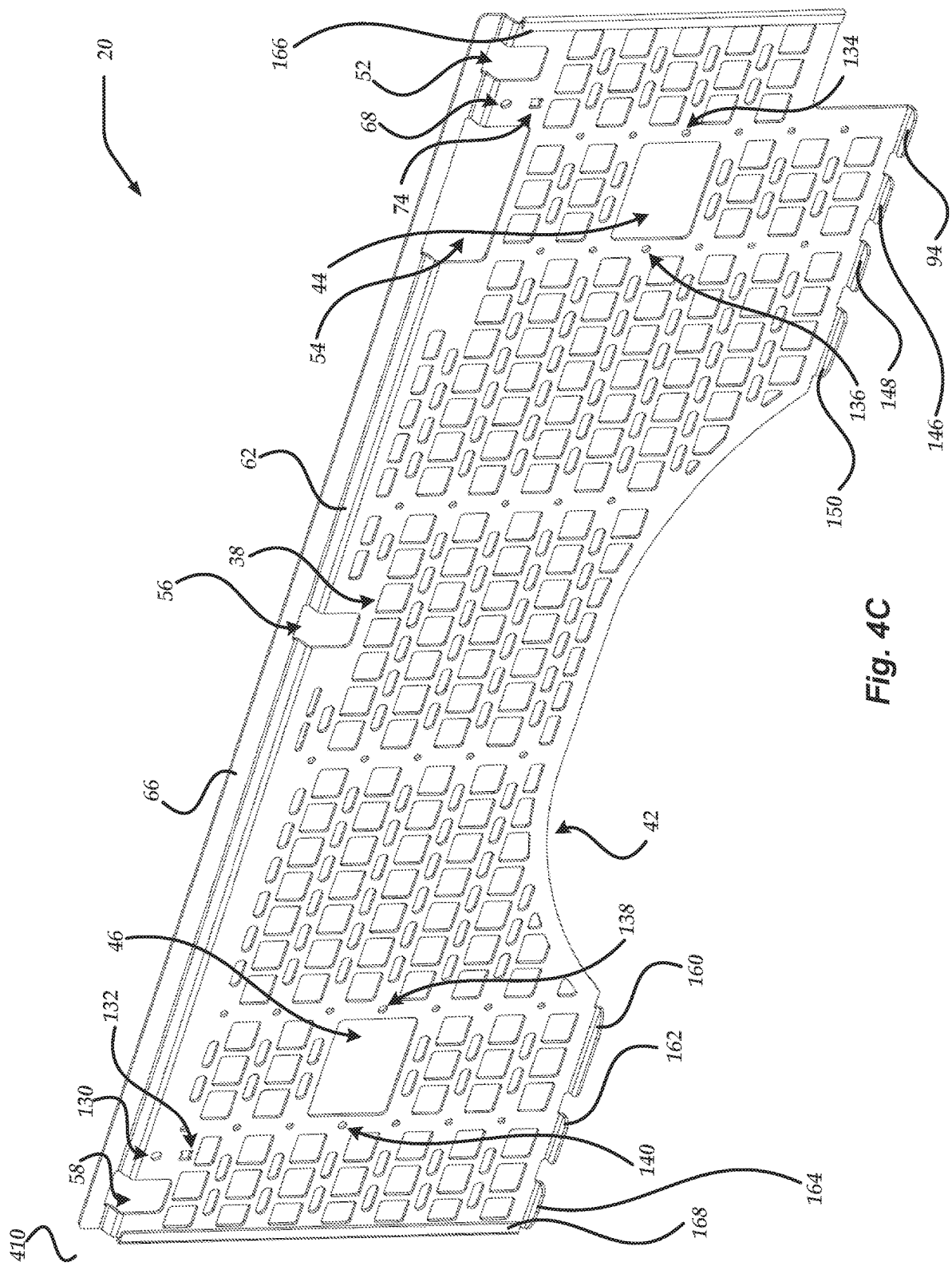
FIG. 4C is an isometric perspective view of the storage panel of FIG. 4A.

FIG. 3A is an isometric perspective cross-sectional view of the storage panel system 2, taken along line AA of FIG. 1 with the clamp 22 shown close-up. The top end portion 30 of the panel 20 refers to each portion of the panel 20 above and including a lowest bend 60 in an upper half, third, fifth, or tenth of the height of the panel 20. The lowest bend 60 of the top end portion 30 preferably separates a displacement portion 62 of the top end portion 24 from the middle portion 34. The top end portion 24 preferably includes a topmost bend 64 that separates the displacement portion 62 of the panel 2 from a clamping portion 66. The displacement portion 62 preferably offsets the middle portion 34 from the clamping portion 66 in a lateral direction away from the longitudinal axis of the floor of the truck bed. The clamping portion 66 preferably resides opposite the upper lip 36 of the sidewall 4 from the one or more clamps to rigidly couple the top end portion 24 of the panel 2 to the sidewall 4. The lowest bend 60, the displacement portion 62, the topmost bend 64, and the clamping portion 66 of the top end portion 30 extend along the length of the panel 20 as best seen in FIGS. 4A-4C. The clamping portion 66 is preferably parallel or substantially parallel (within 3, 5, 10, or 15 degrees of parallel) to the middle portion 34. Preferably, the top end portion 24 preferably includes a continuous or discontinuous jog flange that is generally S-shape or Z-shape and that extends along the length of the panel 20.

The panel 2 preferably has one or more clamping fastener apertures (for example, a clamping fastener aperture 68) that are configured to receive one or more clamping fasteners (for example, a bolt 70) that pull the panel 2 and the one or more clamps toward each other. The panel 2 preferably has a cohesive nut for each clamping fastener aperture (for example, a cohesive nut 72) that, based on the one or more nuts being cohesive to the panel 2 (for example, welded), significantly increase ease of installation of the storage panel system 2. The panel 2 preferably has a clamp securing aperture for each clamp (for example, clamp securing aperture 74) to receive a portion of the one or more clamps and thereby facilitate maintaining the orientation of the one or more clamps relative to the panel 2 by preventing the one or more clamps from rotating about the longitudinal axis of the one or more clamping fasteners.

FIG. 3B is an isometric perspective cross-sectional view of the storage panel system 2, taken along line AA of FIG. 1 with the bracket 26 shown close-up. The sidewall 4 of the truck bed has an outer wall 76 and an inner wall 78 (see FIG. 2A). The inner wall 78 typically has one or more manufacturer-installed mounting structures such as one or more tie-down-ring receiving holes (for example, tie-down-ring receiving hole 80) that are configured to securely receive one or more accessory bed tie-down rings (not shown). The storage panel system 2 preferably has a bracket (for example, brackets 26, 28) and a corresponding mounting-structure access opening (for example, tie-down-ring access openings 44, 46) for each manufacturer-installed mounting structure disposed outward of the panel 2 (i.e., opposite the panel 2 from the longitudinal axis of the floor of the truck bed). The one or more brackets preferably each have a tie-down-ring receiving hole (as discussed further regarding FIG. 6) that, when aligned with the corresponding manufacturer-installed mounting structure, facilitates inserting a tie-down ring through the tie-down-ring receiving hole of the bracket, securing the accessory bed tie-down ring to the manufacturer-installed mounting structure, and thereby clamping the bracket to the sidewall 4. Preferably, unlike the known storage panels, the storage panel system 2 of the present invention advantageously provides access to the one or more manufacturer-installed mounting structures and preferably utilizes the one or more manufacturer-installed mounting structures to rigidly secure the panel 2 to the sidewall 4.

The one or more brackets are preferably separable from the panel 2 to facilitate improving ease of installation. Each bracket preferably has two or more bracket-fastener apertures (see FIG. 6), and the panel 2 preferably has corresponding bracket-fastener apertures (see FIG. 4A) to facilitate receiving corresponding bracket fasteners (for example, a bolt 90) that rigidly secure the panel 20 to the one or more brackets. Each bracket preferably has a cohesive nut for each bracket-fastener aperture of the bracket (for example, a cohesive nut 92) that, based on the cohesive nuts being cohesive to the bracket (for example, welded), significantly increase ease of coupling the panel 2 to the one or more brackets.

FIG. 3C is an isometric perspective cross-sectional view of the storage panel system 2, taken along line AA with a foot 94 shown close-up. The bottom end portion 32 of the panel 20 refers to each portion of the panel below and including a highest bend 96 in a lower half, third, fifth, or tenth of the height of the panel 20. The highest bend 96 of the bottom end portion 32 preferably separates one or more feet (see FIG. 4C) from the middle portion 34. The one or more feet extend in the opposite direction as measured in the lateral dimension from the displacement section 62. The truck shown in the figures has one or more side rails (for example, side rails 98-102) that define stud channels therebetween or between one of the side rails and another truck bed feature such as the wheel-well hump 40 (for example, stud channels 104-110) that facilitate longitudinally securing wood studs (for example, 2 inch×4 inch wood studs) that extend laterally across the truck bed. The one or more feet are preferably configured to be received in an upper portion of one or more of the stud channels without interfering with access to and use of a usable portion of the one or more stud channels (for example, a portion of the one or more stud channels that is sufficiently large enough to secure a 2 inch×4 inch wood stud that laterally extends across the truck bed). For example, as shown in the figures, the feet are disposed sufficiently above a bottom transition portion 112 of the inner wall 78 that transitions between a generally vertically oriented (more vertical than horizontal) portion 114 of the inner wall 78 and a generally horizontally orientated (more horizontal than vertical) portion 116 of the inner wall 78 when the truck is on horizontal ground to facilitate receiving an end portion of a 2 inch×4 inch wood stud in the channels 106-110, with at least a portion of an end face of the wood stud contacting the vertical portion 114 of the inner wall 78.

FIG. 4A is an isometric elevational view of the storage panel 20. The panel 20 preferably defines a vertical axis 118, a longitudinal axis 120, and a lateral axis 122 (see FIG. 4B). The panel 20 preferably has two clamping fastener apertures 68, 130 and two clamp securing apertures 74, 132. The panel 20 preferably has four bracket-fastener apertures 134-140, with one bracket-fastener adjacent to each longitudinal side of a corresponding one of the tie-down-ring access openings 44, 46.

FIG. 4B is an isometric side elevational view of the storage panel 20. The one or more clamps preferably apply a force to the panel 20 in a laterally inward direction 142 (toward the longitudinal axis of the floor of the truck bed as measured in the lateral dimension). The one or more brackets that are rigidly secured to sidewall 4 at the one or more manufacturer-installed mounting features on the outer side of the panel 20 preferably apply a force to the panel 20 in a laterally outward direction 144 (away from the longitudinal axis of the floor of the truck bed as measured in the lateral dimension). Preferably, absent other forces, the panel 20 experiences a rotational force (clockwise for a left side panel and counter-clockwise for a right side panel when viewed from a rear end of the truck). The rotational force preferably pushes the one or more feet against the sidewall 4 and thereby increases stability of the panel (reduced movement of the panel 20 relative to the sidewall 4) to provide sufficient rigidity for off-road applications without securing the bottom end portion 32 of the panel 20, preferable the bottom 20% of the panel 20, more preferably the bottom 30% of the panel 20, and most preferably the bottom 40% of the panel 20 (as measured relative to the portion of the panel 20 having the greatest height) to the sidewall 4.

FIG. 4C is an isometric perspective view of the storage panel 20. The panel 20 preferably has one or more feet (for example, feet 94 and 146-150) disposed rearward of the wheel-well-hump recess 42 and one or more feet (for example, feet 160-164) disposed forward of the wheel-well-hump recess 42. One or more of the front end portion or the rear end portion of the panel 20 has one or more hems (for example, hems 166, 168) that extend along the height of the panel 20.

FIG. 5 is an isometric perspective view of the clamp 24. The clamp 24 preferably has a lip-contact portion 180, a panel-contact portion 182, and a fastener-contact portion 184 that extends from the lip-contact portion 180 to the panel-contact portion 182. The fastener-contact portion 184 preferably has a clamping fastener aperture 186 to receive a clamping fastener (for example, the clamping fastener 70) to pull the panel 20 toward the clamp 24. The panel-contact portion 182 preferably has a securing projection 188 that extends into the clamp securing aperture 132 of the panel 20 to facilitate maintaining the orientation of the clamp 24 relative to the panel 2 by preventing the clamp from rotating about the longitudinal axis of the clamping fastener. The lip-contact portion 180, the panel-contact portion 182, and the fastener-contact portion 184 are preferably disposed in three respective planes that are transverse to each other. As best seen in FIG. 3A, the clamp 22 is preferably the same as or similar to the clamp 24.

FIG. 6 is an isometric elevational view of the bracket 28. The bracket 28 preferably has two panel-contact flanges 190, 192, two stability arms 194, 196 that extend outward respectively from the panel-contact flanges 190, 192, and a mounting plate 198 that extends from one stability arm 194 to the other stability arm 196 and from which the stability arms 194, 196 extend inward in the lateral dimension when the bracket 28 is installed in the sidewall 4 of the truck. The mounting plate 198 preferably has a tie-down-ring receiving hole 210 that, when aligned with a corresponding manufacturer-installed mounting structure (for example, tie-down-ring receiving hole 80 in sidewall 4), facilitates inserting a tie-down ring through the tie-down-ring receiving hole 210 of the bracket 28, securing the tie-down ring to the manufacturer-installed mounting structure, and thereby clamping the bracket 28 to the sidewall 4. The panel-contact flanges 190, 192 preferably respectively include bracket-fastener apertures 212, 214 that facilitate receiving fasteners to rigidly secure the panel 20 to the bracket 28. The panel-contact flanges 190, 192 preferably include mounting features (for example, mounting openings 216-222) that align with each mounting feature in the panel 20 that the flanges 190, 192 overlap when the panel 20 is secured to the bracket 28. As best seen in FIG. 3B, the bracket 26 is preferably the same as or similar to the bracket 28.

Figure 7:
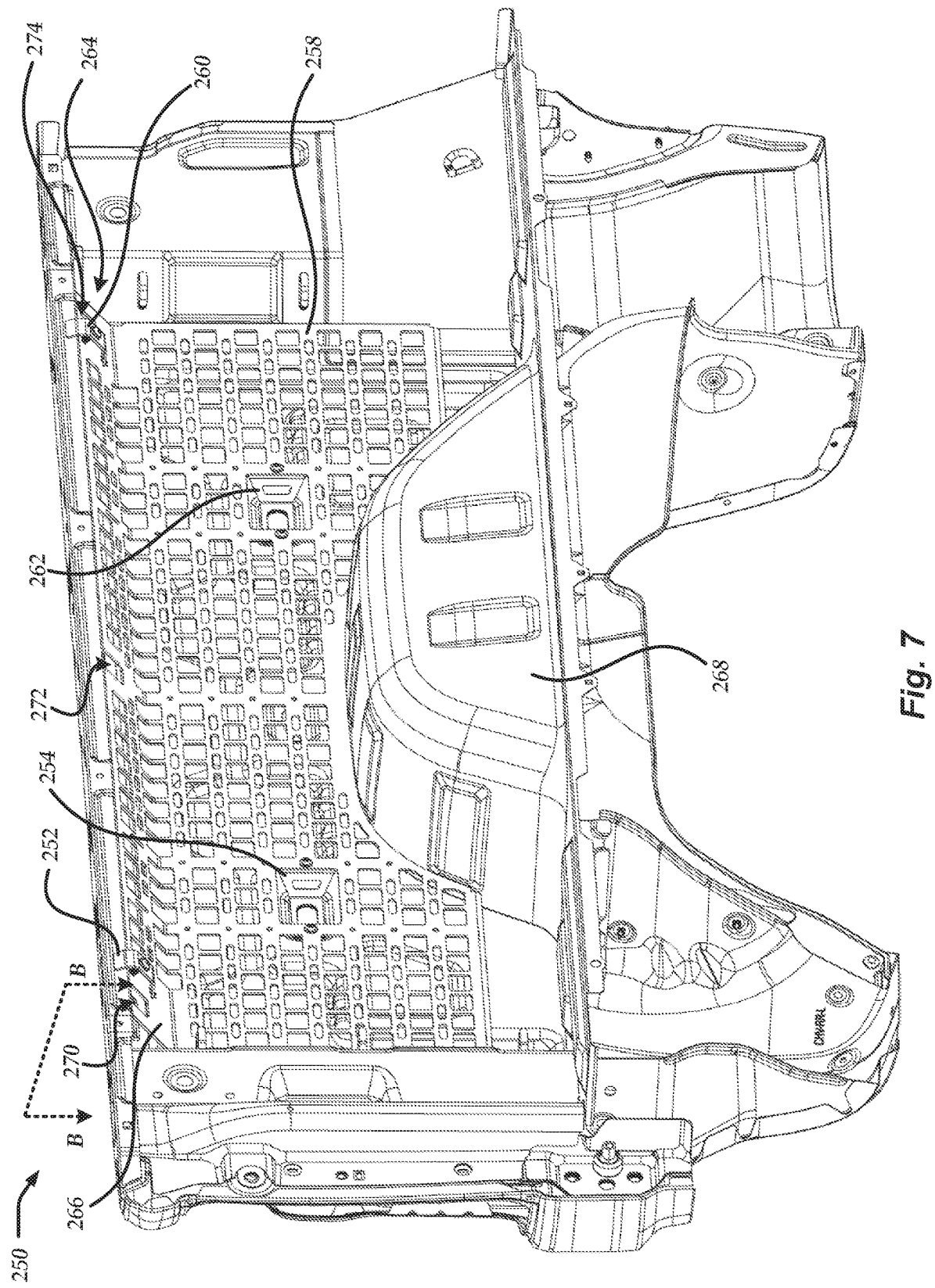
FIG. 7 is an isometric perspective view of a preferred storage panel system installed in a pickup truck bed.
Figure 8B:
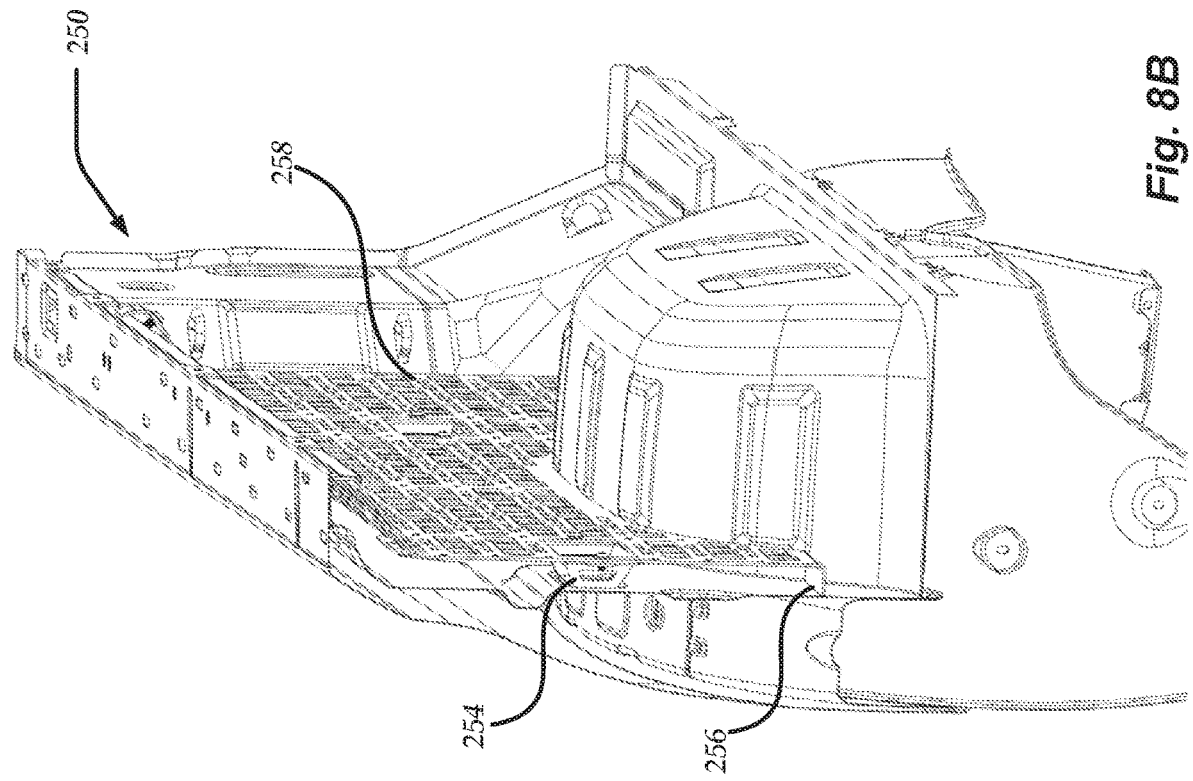
FIG. 8B is an isometric perspective cross-sectional view of the storage panel system of FIG. 7, taken along line BB.
Figure 8A:
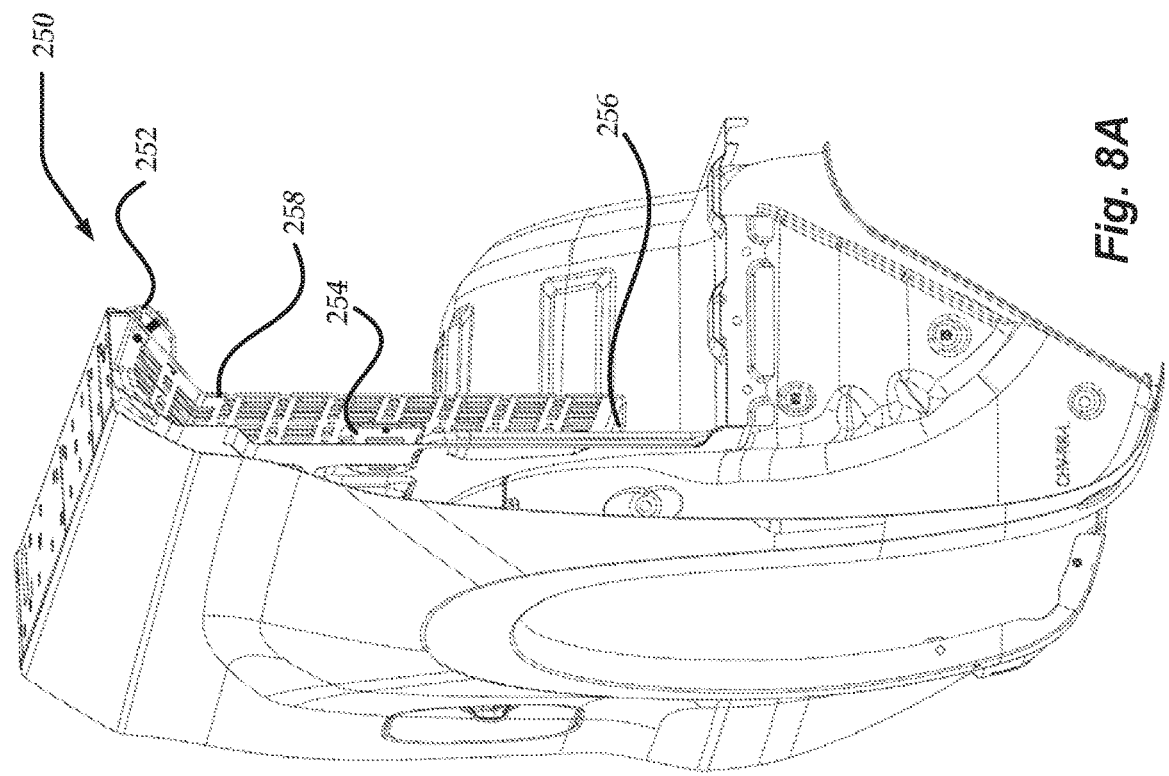
FIG. 8A is an isometric perspective cross-sectional view of the storage panel system of FIG. 7, taken along line BB.
Figure 10C:
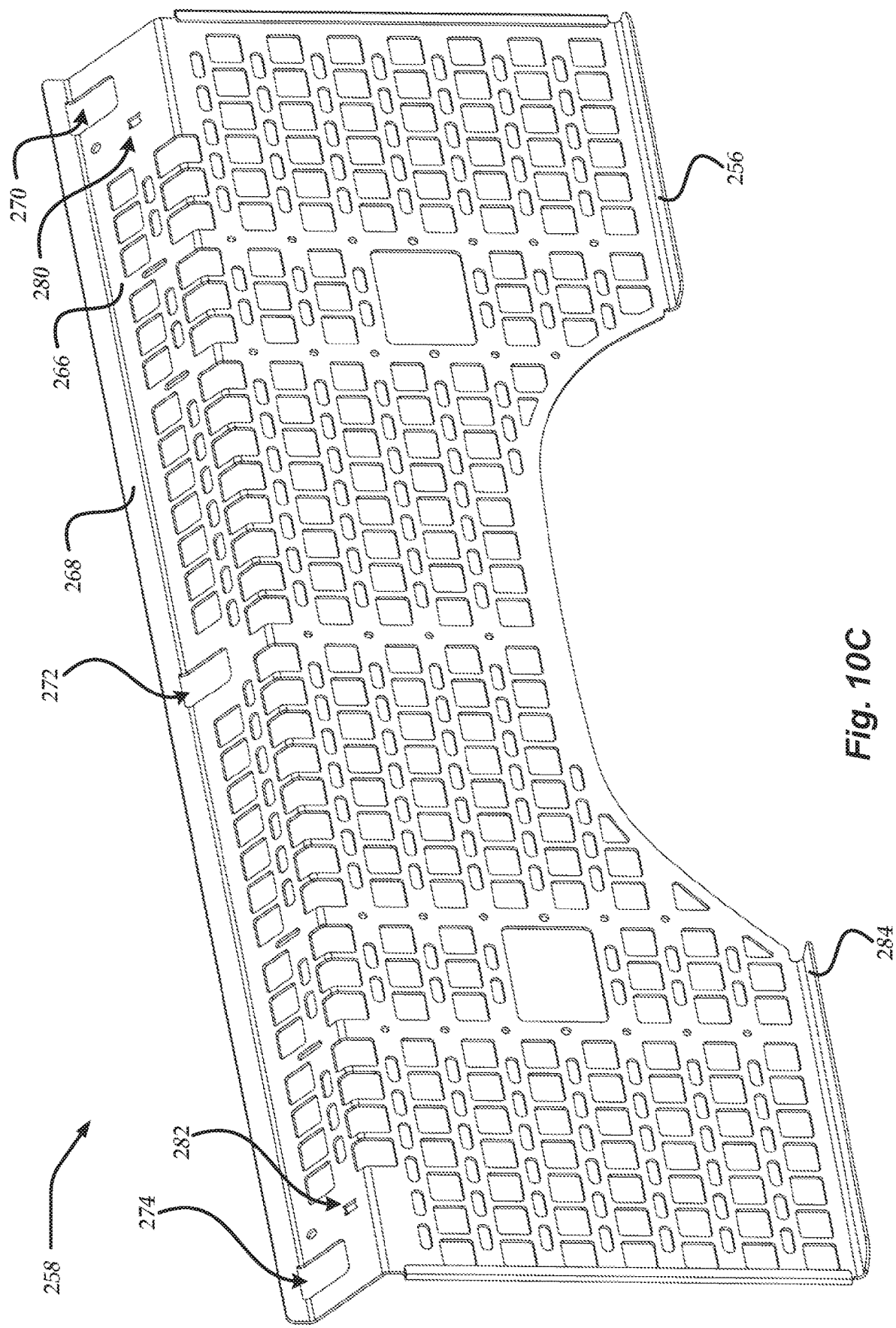
FIG. 10C is an isometric perspective view of the storage panel of FIG. 10A.
Figure 12:
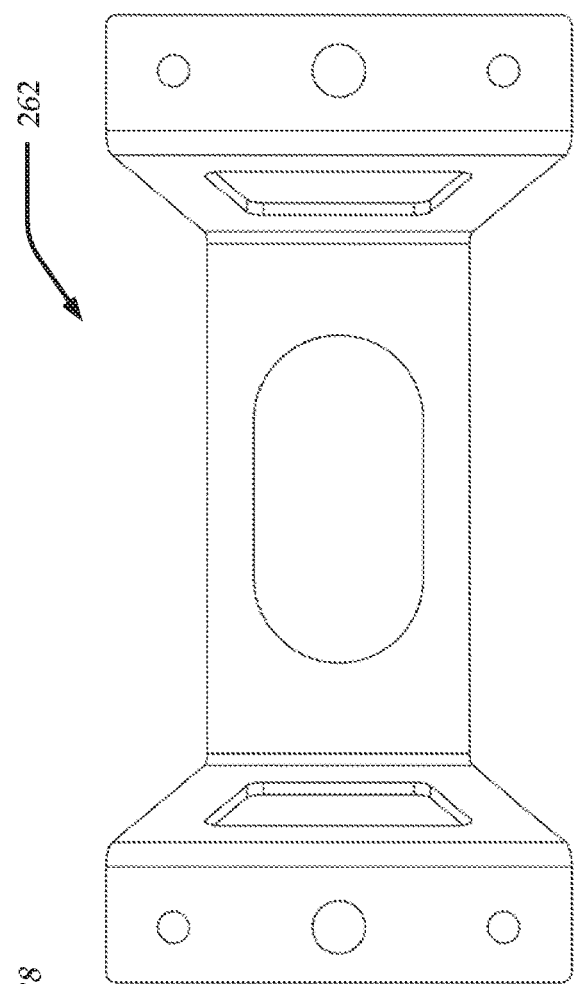
FIG. 12 is an isometric elevational view of a preferred bracket of the storage panel system of FIG. 7.
Figure 11:
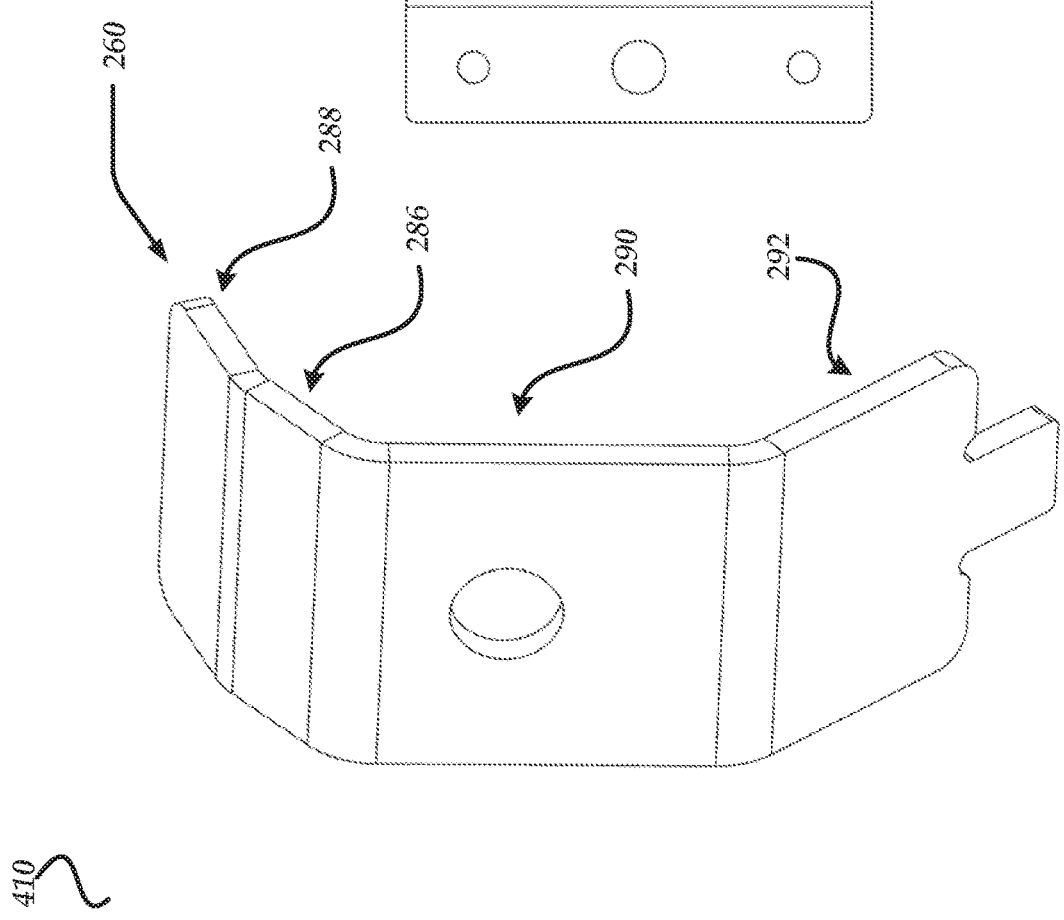
FIG. 11 is an isometric perspective view of a preferred clamp of the storage panel system of FIG. 7.

Although the storage panel system 2 is shown as being configured for and installed in a long wheel base midsize pickup truck available under the mark GENERAL MOTORS (for example, as sold with a year indicator of 2014), storage panel systems of the present invention can be configured for and installed in other trucks according to the principles of the present invention. For example, FIG. 7 is an isometric perspective view of a preferred storage panel system 250 in accordance with the principles of the invention installed in a bed of a standard bed of a full size pickup truck available under the mark GENERAL MOTORS (for example, as sold with a year indicator of 2019). FIG. 8A is an isometric perspective cross-sectional view of the storage panel system 250, taken along line BB in FIG. 7. FIG. 8B is an isometric perspective cross-sectional view of the storage panel system 250, taken along line BB. FIG. 9A is an isometric perspective cross-sectional view of the storage panel system 250, taken along line BB with a clamp 252 of the storage panel system 250 shown close-up. FIG. 9B is an isometric perspective cross-sectional view of the storage panel system 250, taken along line BB with a bracket 254 of the storage panel system 250 shown close-up. FIG. 9C is an isometric perspective cross-sectional view of the storage panel system 250, taken along line BB with a foot 256 of a storage panel 258 of the storage panel system 250 shown close-up. FIG. 10A is an isometric elevational view of the storage panel 258. FIG. 10B is an isometric side elevational view of the storage panel 258. FIG. 10C is an isometric perspective view of the storage panel 258. FIG. 11 is an isometric perspective view of a preferred clamp 260 of the storage panel system 250. FIG. 12 is an isometric elevational view of a preferred bracket 262 of the storage panel system 250.

Many features of the storage panel system 250 are the same as or similar to the corresponding features of the storage panel system 2. The top end portion 264 of the panel 258 has mounting features disposed in the displacement portion 266. As with the panel 20 of the storage panel system 2, the panel 252 extends no lower than the top 70, 80, or 90 percent of the height of the wheel-well hump 268 as measured from the highest portion of the wheel-well hump 268 to the top surface of the floor of the truck bed as measured in the vertical direction (i.e., the bottom 10, 20, 30, or more percent of the height of the wheel-well hump 268 that is visible absent the storage panel system 250 is also completely visible and accessible by the user when the storage panel system 250 is installed, without moving any portion of the storage panel system 250). The clamp securing apertures 280, 282 are disposed in the displacement portion 266 of the panel 258 (see FIGS. 9A, 10A, and 10C). The panel 258 has a single foot on each side of the wheel-well hump 268 (see feet 256, 284 in FIG. 10C). The clamp 260 has an orienting portion 286 that separates the lip-contact portion 288 from the fastener-contact portion 290 and facilitates orienting the fastener-contact portion 290 parallel or substantially parallel (for example, within 15, 10, 5, or fewer degrees) to the displacement portion 266 of the panel 258 (see FIG. 9A). The orienting portion 286, the lip-contact portion 288, the fastener-contact portion 290, and the panel-contact portion 182 are preferably disposed in four respective planes that are transverse to each other. As best seen in FIG. 9A, the clamp 252 is preferably the same as or similar to the clamp 260. The bracket 254 is preferably the same as or similar to the bracket 262. The panel 258 preferably has one or more clamp openings disposed in one or more of the displacement portion 266 or a clamping portion 268 (see FIG. 10A) (for example, clamp openings 270-274 disposed in the displacement portion 266 and the clamping portion 268) that facilitate clamping one or more accessories to the bed rail, such as clamping or locking truck-bed canopies, canopy racks, or covers (not shown) in a closed configuration (for example, an unrolled configuration) in which the top of the truck bed is completely closed or rails (not shown) that support truck-bed covers (for example, tonneau covers such as roll-up tonneau covers available under the mark BAK REVOLVER OR BAK REVOLVER X2, truck bed canopies, or other accessories).

As used herein, the following terms take the meanings explicitly associated herein, unless the context clearly dictates otherwise. The term "or" is an inclusive grammatical conjunction to indicate that one or more of the connected terms may be employed. For example, the phrase "one or more A, B, or C" or the phrase "one or more As, Bs, or Cs" is employed to discretely disclose each of the following: i) one or more As, ii) one or more Bs, iii) one or more Cs, iv) one or more As and one or more Bs, v) one or more As and one or more Cs, vi) one or more Bs and one or more Cs, and vii) one or more As, one or more Bs, and one or more Cs. The term "based on" as used herein is not exclusive and allows for being based on additional factors not described. The articles "a," "an," and "the" include plural references. Plural references are intended to also disclose the singular.

The terms "front," "forward," "rear," and "rearward" are defined relative to the longitudinal axis of the truck or the panel of the storage panel system when installed in the truck. The longitudinal axis of the truck extends from the tailgate to the front end of the cab along the lateral middle of the truck. The terms "front" and "forward" indicate the end portion closer to or in the direction of the cab of the truck when the storage panel system is installed (to the right in FIG. 1). The terms "rear" and "rearward" indicate the end portion closer to or in the direction of the tailgate of the truck when the storage panel system is installed (to the left in FIG. 1). The terms "height," "vertical," "upper," "lower," "above," "below," "top," "bottom," "topmost," and "bottom-most" are defined relative to vertical axis of the truck or the panel of the storage panel system when installed in the truck. The vertical axis is transverse to the longitudinal axis and is defined as parallel to the direction of the earth's gravity force on the truck or panel when the truck is on horizontal ground. The term "lateral" is defined relative to the lateral axis of the truck or the panel of the storage panel system when installed in the truck. The lateral axis is transverse to the longitudinal and vertical axes.

The terms "inward" and "outward" are defined relative to a minority axis selected from the longitudinal axis or the lateral axis of the truck bed and are measured along a majority axis selected from the longitudinal axis or the lateral axis of the truck bed and extending toward the referenced subject from the axis of minority. For example, a first point at a first height and a second point at a second height that is different than the first height may be disposed at different distances from the center of the truck bed, yet the first and second points may be both disposed along the left sidewall of the truck bed and may thus be compared in terms of their respective inward or outward dispositions along the lateral axis of the truck bed (majority axis because it extends from the center of the truck bed to the left sidewall) relative to the longitudinal axis of the truck bed (minority axis because it does not extend from the center of the truck bed to the left sidewall). As another example, the first point and the second point may be disposed along the front wall of the truck bed and my thus be compared in terms of their respective inward or outward dispositions along the longitudinal axis of the truck bed (majority axis because it extends from the center of the truck bed to the front wall) relative to the lateral axis of the truck bed (minority axis because it does not extend from the center of the truck bed to the front wall). The inward direction extends toward the center of the truck bed (the intersection of the longitudinal axis of the truck bed and the lateral axis of the truck bed). The outward direction extends away from the center of the truck bed. The term "configured" refers to sized, dimensioned, positioned, or oriented.

The phrase "sufficient rigidity for off-road activities" means that, during off-road activities such as recreational driving off-road or commercial or other jobsite off-road driving such as forest service or logging activities, the subject maintains a fixed position and orientation relative to an object to which the subject is mounted. During off-road activities, the storage panel of the present invention maintains a fixed position and orientation relative to the sidewall of the truck bed of the pickup truck in which the storage panel system is installed. In contrast, an object (for example, a bag or panel) that is strapped to a sidewall of a truck bed of a pickup truck typically tends to move relative to the sidewall during off-road activities and, thus, fails to provide sufficient rigidity for off-road activities.

The term "manufacturer-installed" means that the object described by this adjective exists in the pickup truck at the time of its original sale from a vehicle manufacturer or dealership to a user. The term "without directly coupling" means that the subject is not itself connected or joined to the object. For example, the foot 94 contacts the sidewall 4 yet is not directly coupled to the sidewall 4 (although the storage panel is coupled to the sidewall preferably via the one or more clamps or brackets). The term "hand access" means that a user can contact and manipulate a feature with the user's hand as the feature is intended to be used.

Notably, pickup trucks, truck beds, truck bed sidewalls, sidewall bed rails, and bed rail lips are of various shapes and sizes. Accordingly, some features or characteristics of the present invention are best understood by one of ordinary skill in the art when defined relative to one or more elements that are related to yet are not comprised in the present invention, such as one or more features or characteristics of pickup trucks, truck beds, truck bed sidewalls, sidewall bed rails, or bed rail lips. Also accordingly, where features or characteristics of the present invention are defined herein relative to one or more elements that are related to yet are not comprised in the present invention, such definitions are as accurate as the subject matter permits. It should also be noted that one of ordinary skill in the art realizes from the present disclosure that those features or characteristics of the present invention could be easily obtained according to the principles of the present invention for a given lip, sidewall, truck bed, pickup truck, or other related element that is not comprised in the present invention.

While the preferred embodiment of the invention has been illustrated and described, as noted above, many changes can be made without departing from the spirit and scope of the invention. For example, each disclosure of a component (for example, the storage panel system, the panel, the top end portion of the panel, or other components) preferably having a feature or characteristic is intended to also disclose the component as being devoid of that feature or characteristic, unless the principles of the invention clearly dictate otherwise. Accordingly, the scope of the invention is not limited by the disclosure of the preferred embodiment. Instead, the invention should be determined entirely by reference to the claims that follow.

I claim:

1. A panel system for a truck, the system defining a vertical axis, a longitudinal axis, and a lateral axis, the system comprising:
    a panel that defines a middle portion that extends along the vertical axis and the longitudinal axis and that has an array of mounting features that include openings configured to rigidly receive accessories or accessory mounts;

a clamping portion that extends along the longitudinal axis and that is disposed above the middle portion along the vertical axis; and a displacement portion that is disposed between the middle portion and the clamping portion and that defines an offset of the middle portion from the clamping portion along the lateral axis;

a clamp having a lip-contact portion and a panel-contact portion, the clamp being configured to pull the clamping portion toward a lip of a bed rail of a sidewall of a truck bed of the truck with the lip-contact portion of the clamp contacting the lip of the bed rail and with the panel-contact portion of the clamp contacting one of the middle portion or the displacement portion and to thereby couple the panel system to the sidewall of the truck bed of the truck; and a foot that extends from the middle portion along the lateral axis in a direction opposite to a direction that the displacement portion extends from the middle portion along the lateral axis, the foot being configured to, when the panel system is coupled to the sidewall of the truck bed of the truck, press against the sidewall of the truck bed of the truck to thereby reduce movement of the middle portion relative to the sidewall of the truck bed of the truck during use, wherein the foot lacks a fastener opening that facilitates securing the foot to the sidewall of the truck bed of the truck.

2. The panel system of claim 1, wherein, when the panel system is coupled to the sidewall of the truck bed of the truck, no portion of the middle portion and the displacement portion extends farther along the lateral axis in a direction that the clamp pulls the clamping portion than the clamping portion.

3. The panel system of claim 1, further comprising:
a bracket, the bracket including:
  a mounting plate defining a tie-down-ring receiving hole that, when aligned with a manufacturer-installed mounting structure in the sidewall of the truck bed of the truck, is configured to facilitate inserting a tie-down ring through the mounting plate, securing the tie-down ring to the manufacturer-installed mounting structure in the sidewall of the truck bed of the truck, and thereby clamping the bracket to the sidewall of the truck bed of the truck;
  a stability arm that extends toward the middle portion from the mounting plate; and
  a panel-contact flange that extends along the middle portion from the stability arm and that is configured to couple the bracket to the middle portion and thereby couple the panel system to the sidewall of the truck bed of the truck with the mounting plate of the bracket being disposed opposite the clamping portion from the lip of the bed rail of the sidewall of the truck bed of the truck.

4. The panel system of claim 1, wherein the panel defines the foot.

5. The panel system of claim 1, wherein the middle portion defines a tie-down-ring access opening that is configured to, when the panel system is coupled to the sidewall of the truck bed of the truck, provide a user hand access to utilize a tie-down ring secured to a manufacturer-installed mounting structure in the sidewall of the truck bed of the truck through the middle portion with the manufacturer-installed mounting structure being disposed opposite the clamping portion from the lip of the bed rail along the lateral axis, without moving any portion of the panel system.

6. The panel system of claim 1, wherein the sidewall of the truck bed of the truck has a wheel-well hump that has a lateral length measured parallel to the lateral axis when the panel system is coupled to the sidewall of the truck bed of the truck, and the panel system is configured to, when the panel system is coupled to the sidewall of the truck bed of the pickup truck, have no portion of the middle portion and the displacement portion extend farther than 50% of the lateral length of the wheel-well hump in the direction of the clamping portion from the middle portion along the lateral axis.

7. The panel system of claim 1, wherein the sidewall of the truck bed of the truck has a wheel-well hump that has a height measured parallel to the vertical axis when the panel system is coupled to the sidewall of the truck bed of the truck, and the panel system is configured to, when the panel system is coupled to the sidewall of the truck bed of the truck, have no portion of the middle portion extend lower than a top 80% of the height of the wheel-well hump along the vertical axis.

8. The panel system of claim 1, wherein one of the middle portion or the displacement portion defines a clamp securing aperture, and the clamp has a securing projection that is configured to, when the panel system is coupled to the sidewall of the truck bed of the truck, extend into the clamp securing aperture to facilitate maintaining an orientation of the clamp relative to the middle portion.

9. The panel system of claim 1, wherein one of the middle portion or the displacement portion defines a clamping fastener aperture to facilitate pulling the clamping portion toward the lip of the bed rail of the sidewall of the truck bed of the truck with a clamping fastener that extends from the clamp into the clamping fastener aperture.

10. The panel system of claim 1, wherein the sidewall has a vertically oriented portion that is offset from the lip of the bed rail of the sidewall of the truck bed of the truck along the lateral axis when the panel system is coupled to the sidewall, and, when the panel system is coupled to the sidewall, the middle portion, the clamping portion, and the displacement portion are disposed under the bed rail of the sidewall and between the vertically oriented portion of the sidewall and the lip of the bed rail.

11. A panel system for a truck, the system defining a vertical axis, a longitudinal axis, and a lateral axis, the system comprising:
a panel that defines a middle portion that extends along the vertical axis and the longitudinal axis and that has an array of mounting features that include openings configured to rigidly receive accessories or accessory mounts;
a clamping portion that extends along the longitudinal axis and that is disposed above the middle portion along the vertical axis; and
a displacement portion that is disposed between the middle portion and the clamping portion and that defines an offset of the middle portion from the clamping portion along the lateral axis,
wherein the clamping portion is configured to contact a lip of a bed rail of a sidewall of a truck bed of the truck when the panel system is coupled to the sidewall of the truck bed of the truck,
wherein at least the displacement portion and the clamping portion define a clamp opening that, when the panel system is coupled to the sidewall of the truck bed of the truck, facilitates locking a bed cover in a closed configuration over a top of the truck bed of the truck.

12. The panel system of claim 11, wherein the middle portion and the displacement portion are disposed on a same side of the clamping portion as measured along the lateral axis.

13. The panel system of claim 11, further comprising:
a bracket, the bracket including:
a mounting plate defining a tie-down-ring receiving hole that, when aligned with a manufacturer-installed mounting structure in the sidewall of the truck bed of the truck, is configured to facilitate inserting a tie-down ring through the mounting plate, securing the tie-down ring to the manufacturer-installed mounting structure in the sidewall of the truck bed of the truck, and thereby clamping the bracket to the sidewall of the truck bed of the truck;
a stability arm that extends toward the middle portion from the mounting plate; and
a panel-contact flange that extends along the middle portion from the stability arm and that is configured to couple the bracket to the middle portion and thereby couple the panel system to the sidewall of the truck bed of the truck with the mounting plate of the bracket being disposed opposite the clamping portion from the lip of the bed rail of the sidewall of the truck bed of the truck.

14. The panel system of claim 11, further comprising a foot that extends away from the middle portion along the lateral axis in a direction opposite to a direction that the displacement portion extends from the middle portion along the lateral axis, the foot being configured to, when the panel system is coupled to the sidewall of the truck bed of the truck, press against the sidewall of the truck bed of the truck to thereby reduce movement of the middle portion relative to the sidewall of the truck bed of the truck during use, without the foot directly coupling to the sidewall of the truck bed of the truck.

15. The panel system of claim 11, wherein the middle portion defines a tie-down-ring access opening that is configured to, when the panel system is coupled to the sidewall of the truck bed of the truck, provide a user hand access to utilize a tie-down ring secured to a manufacturer-installed mounting structure in the sidewall of the truck bed of the truck through the middle portion with the manufacturer-installed mounting structure being disposed opposite the clamping portion from the lip of the bed rail along the lateral axis, without moving any portion of the panel system.

16. The panel system of claim 11, wherein the clamp opening is enclosed.

17. The panel system of claim 11, further comprising:
a clamp having a lip-contact portion and a panel-contact portion, the clamp being configured to pull the clamping portion toward the lip of the bed rail of the sidewall of the truck bed of the truck with the lip-contact portion of the clamp contacting the lip of the bed rail and with the panel-contact portion of the clamp contacting one of the middle portion or the displacement portion, to cooperatively with the clamping portion clamp the lip of the bed rail, and to thereby couple the panel system to the sidewall of the truck bed of the truck.

18. The panel system of claim 17, wherein one of the middle portion or the displacement portion defines a clamp securing aperture, and the clamp has a securing projection that is configured to, when the panel system is coupled to the sidewall of the truck bed of the truck, extend into the clamp securing aperture to facilitate maintaining an orientation of the clamp relative to the middle portion.

19. The panel system of claim 17, wherein the one of the middle portion or the displacement portion defines a clamping fastener aperture to facilitate pulling the clamping portion toward the lip of the bed rail of the sidewall of the truck bed of the truck with a clamping fastener that extends from the clamp into the clamping fastener aperture.

20. The panel system of claim 11, wherein the sidewall has a vertically oriented portion that is offset from the lip of the bed rail of the sidewall of the truck bed of the truck along the lateral axis when the panel system is coupled to the sidewall, and, when the panel system is coupled to the sidewall, the middle portion, the clamping portion, and the displacement portion are disposed under the bed rail of the sidewall and between the vertically oriented portion of the sidewall and the lip of the bed rail.

* * * * *